United States Patent
Hirasawa

(10) Patent No.: US 6,874,961 B2
(45) Date of Patent: Apr. 5, 2005

(54) PRINTING PAPER AND METHOD FOR PRINTING

(75) Inventor: Kouichi Hirasawa, Saitama-ken (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 10/073,984

(22) Filed: Feb. 14, 2002

(65) Prior Publication Data

US 2002/0086128 A1 Jul. 4, 2002

Related U.S. Application Data

(62) Division of application No. 09/547,877, filed on Apr. 12, 2000.

(30) Foreign Application Priority Data

Apr. 12, 1999  (JP) .................................. 11-104064

(51) Int. Cl.$^7$ ................................. B41J 13/00
(52) U.S. Cl. .................. 400/578; 400/611; 400/621; 101/93.07; 428/43
(58) Field of Search ........................... 428/43; 400/578, 400/611, 621, 621.1, 621.2; 101/93.07

(56) References Cited

U.S. PATENT DOCUMENTS

| | | | |
|---|---|---|---|
| 4,033,611 A | * 7/1977 | Johnsen | ...................... 283/101 |
| 5,389,414 A | * 2/1995 | Popat | ........................ 428/40.1 |
| 5,571,358 A | 11/1996 | Napier et al. | |
| 5,571,587 A | * 11/1996 | Bishop et al. | ................. 428/43 |
| 5,824,178 A | * 10/1998 | Shingu et al. | .............. 156/265 |
| 5,853,837 A | * 12/1998 | Popat | ........................ 428/43 |
| 5,997,683 A | * 12/1999 | Popat | ........................ 156/277 |
| 6,030,134 A | * 2/2000 | Stewart | ................... 400/600.2 |
| 6,106,651 A | 8/2000 | Sieber et al. | |
| 6,187,405 B1 | * 2/2001 | Rudin | ........................ 428/43 |

FOREIGN PATENT DOCUMENTS

| | | |
|---|---|---|
| JP | 5-293794 | 11/1993 |
| JP | 7-214948 | 8/1995 |

* cited by examiner

*Primary Examiner*—Andrew H. Hirshfeld
*Assistant Examiner*—Dave A. Ghatt
(74) *Attorney, Agent, or Firm*—Sughrue Mion, PLLC

(57) ABSTRACT

A method of printing an image on a printing portion of a printing paper using a printer so as to eliminate visible margins. The sheet of printing paper is conveyed within the printer by nipping margins of the sheet. After printing, the printing portion is detached from the printing paper along a cut line. Namely, a print having no margins and no nip markings is formed. Therefore, cutting position controlling mechanisms and paper cutting mechanisms as used in conventional printers are not necessary, and the structure of the printer is thereby made simple. Accordingly, since margins can be eliminated by using a simple structure, photographic printers and the like in particular are made compact and inexpensive.

12 Claims, 8 Drawing Sheets

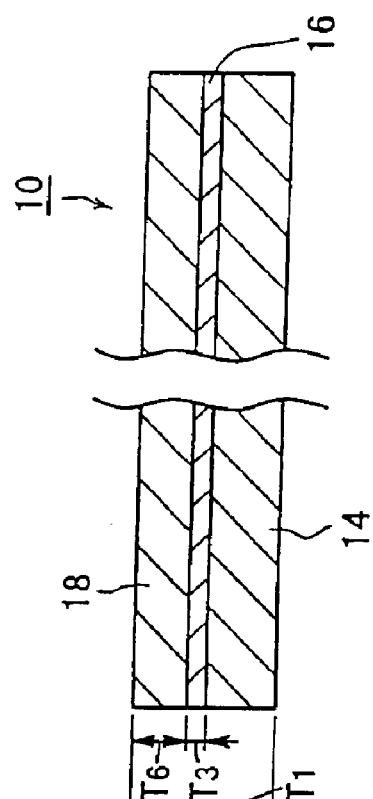
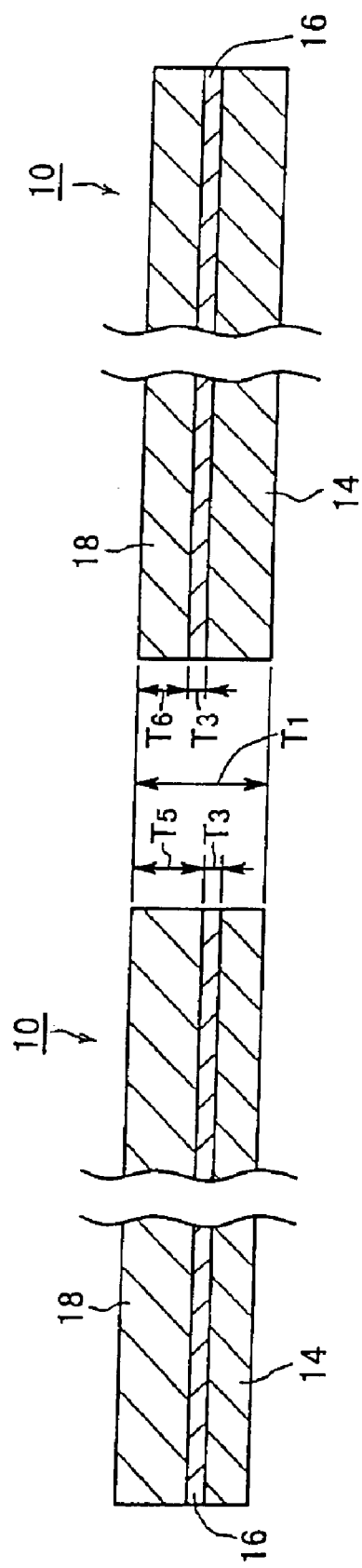
FIG. 9B
FIG. 9A

PRINTING PAPER AND METHOD FOR PRINTING

This is a divisional of application Ser. No. 09/547,877 filed Apr. 12, 2000; the disclosure of which is incorporated herein by reference.

BACKGROUND OF THE INVENTION

1. Field of the Invention

The present invention relates to a printing paper and a printer, and more particularly to a printing paper and a method for printing for eliminating, by simple means, margins formed on a printing paper having a standard size.

2. Description of the Related Art

Japanese Patent Application Laid-Open (hereinafter, "JP-A") No. 5-293794 and the like have proposed means for eliminating margins which are formed on printing papers having standard sizes. This prior art automatically cuts off margins and includes a cutting position controlling mechanism for detecting margins and a paper cutting mechanism for cutting off the detected margins.

Margins are provided on printing papers so that, after an image has been printed on a printing paper by a printer, margins of the printing paper are nipped by a conveying device and the printing paper is thereby conveyed. If, at the time of conveying the printing paper, a portion of a printing paper with an image thereon is nipped, defects may be formed on the image. Therefore, it is preferable to provide margins for nipping.

On the other hand, the reasons for cutting off margins are the following. First, in the case of photographs and the like, for example, white margins may turn yellow with the passage of time, causing the appearance of photographs to deteriorate. Moreover, generally, photographs having no margins are considered to be better in appearance than those having margins.

However, since it is necessary to include a cutting position controlling mechanism and a paper cutting mechanism, the structure of the above prior art is complicated. If these mechanisms are provided within a photographic printer in particular, there is a drawback in that the entire printer becomes large.

SUMMARY OF THE INVENTION

In view of the aforementioned, an object of the present invention is to provide a printing paper and a method for printing for eliminating margins of photographs and the like by using a simple structure.

A first aspect of the present invention is a printing paper for forming a print having no margins, comprising: a printing material having at least one printing portion; a base material for supporting the printing material; and an adhesive layer which removably adheres the printing material to the base material, the adhesive layer having substantially no adhesive strength remaining on the at least one printing portion after the at least one printing portion is detached from the printing material, wherein the at least one printing portion is detached from the printing material so as to be formed as at least one print.

A second aspect of the present invention is a printing paper for forming a print having no margins, comprising: a printing material having at least one printing portion; a base material for supporting the printing material; and an adhesive layer which removably adheres the printing material to the base material, the adhesive layer having an adhesive strength with respect to the printing material relatively smaller than an adhesive strength with respect to the base material, wherein the at least one printing portion is detached from the printing material so as to be formed as at least one print.

A third aspect of the present invention is a method for printing an image on a printing paper by a printer, comprising the steps of: accommodating a printing paper in an accommodating portion; conveying the printing paper from the accommodating portion to a recording device by a conveying device by nipping margins of the printing paper; printing an image on the printing paper by the recording device; conveying the printing paper from the recording device to a discharging portion by the conveying device by nipping margins of the printing paper; and discharging the printing paper with an image printed thereon to the discharging portion, wherein the printing paper includes at least one printing portion and the margins, and a print is formed by detaching the at least one printing portion from the printing paper after the printing paper with an image printed thereon is discharged to the discharging portion.

In accordance with the present invention, after printing processing has been carried out on a printing portion of a printing material, the printing portion is detached from the printing material, and a print having no margins is thereby formed. Therefore, a cutting position controlling mechanism and a paper cutting mechanism as used in the prior art are not necessary, and the structure of the printer is thereby made simple. In other words, in accordance with the present invention, since margins can be eliminated by using a simple structure, photographic printers and the like in particular can be made compact.

BRIEF DESCRIPTION OF THE DRAWINGS

FIGS. 9A and 9B are cross-sectional views respectively showing a modification of the thickness of a printing material shown in FIG. 2.

DESCRIPTION OF THE PREFERRED EMBODIMENTS

Hereinafter, a printing paper and a method for printing in accordance with an embodiment of the present invention will be described with reference to drawings.

Figure 1:
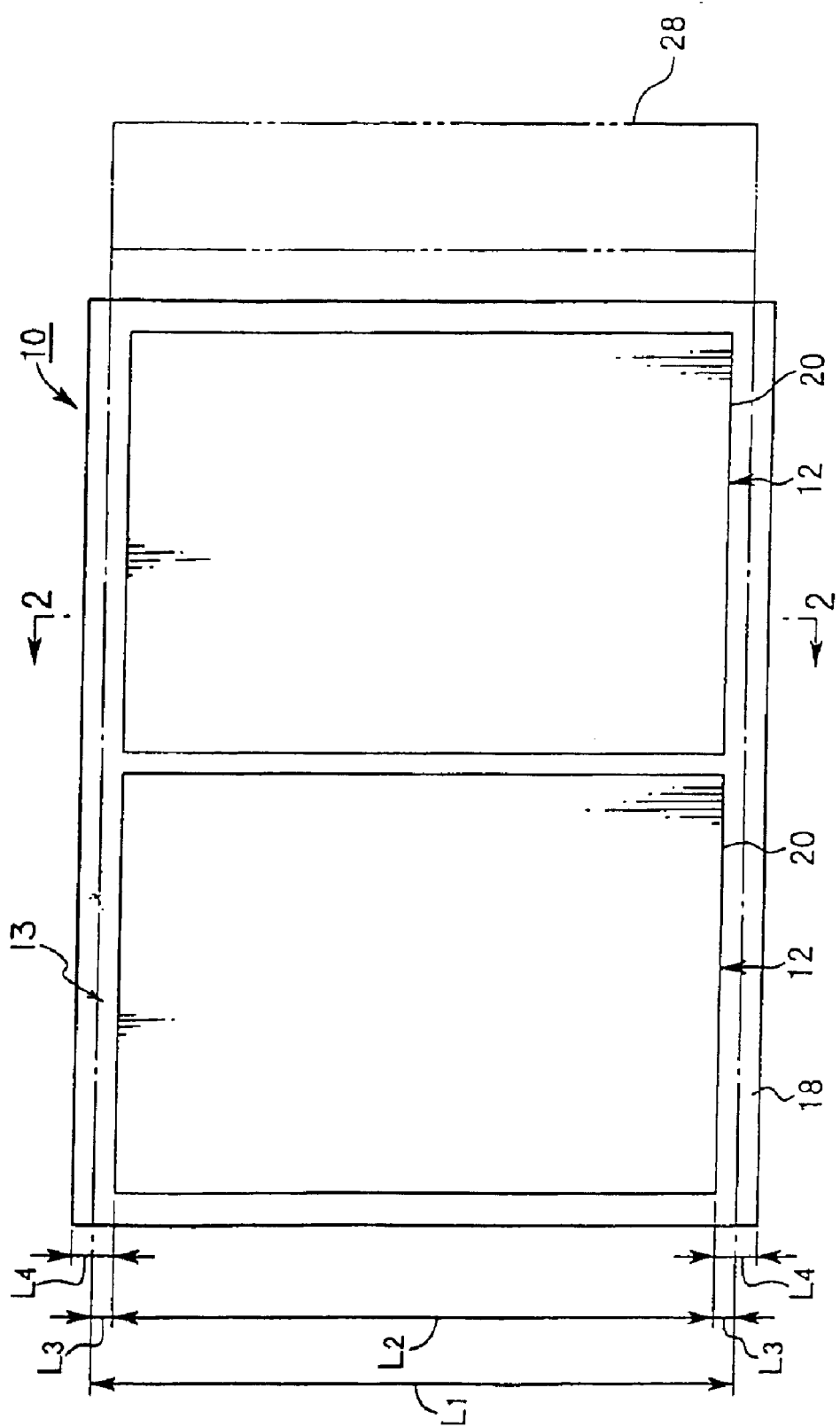
FIG. 1 is a plan view showing a printing paper in accordance with an embodiment of the present invention.

A printing paper 10 is, for example, the standard A6 size (the so-called postal card size). As shown in FIG. 1, a pair of image-forming portions 12 (hereinafter referred to as "sheets"), each having a size somewhat smaller than the A7 size, is formed on a printing material 18 as printing portions of the printing paper 10. Namely, the pair of sheets 12 is formed on a pair of portions of the printing material 18 which are respectively defined by folding the printing paper 10 in two along a transverse direction of the printing paper 10.

Thin and straight cut lines 20 are formed, as separating means, on the printing material 18. These cut lines 20 serve to separate the sheets 12 from the printing material 18.

A printing area 13 including the sheets 12 is provided on the printing material 18. The printing area 13 is an area on which an image is printed, and is defined in the transverse direction of the printing material 18. A printing area width $L_1$ is a width extending along the transverse direction of the printing material 18 of the printing area 13, and is wider than a sheet width $L_2$ extending along a longitudinal direction of the sheets 12. The printing area 13 includes sheets 12 and a margin width $L_3$ provided at both ends of the sheets 12 in the longitudinal direction thereof. In accordance with the present embodiment, since the margin width $L_3$ (i.e., a play portion) is provided at each end of the sheets 12, even if the printing material 18 is displaced when being conveyed, the printing of images onto the sheets 12 can be effected in a more stable manner.

A margin portion width $L_4$ which includes the margin width $L_3$ is substantially the same as the widths of conventional margin portions. In the present embodiment, portions of the printing paper 10 whose width corresponds to the margin portion width $L_4$ are nipped in a longitudinal direction of the printing paper 10 by a conveying device 25 of a printer 22, which will be described later, and the printing paper 10 is thereby conveyed. Further, in the present invention, the printing area width $L_1$ may be made the same as the sheet width $L_2$ of the sheet 12.

Figure 2:
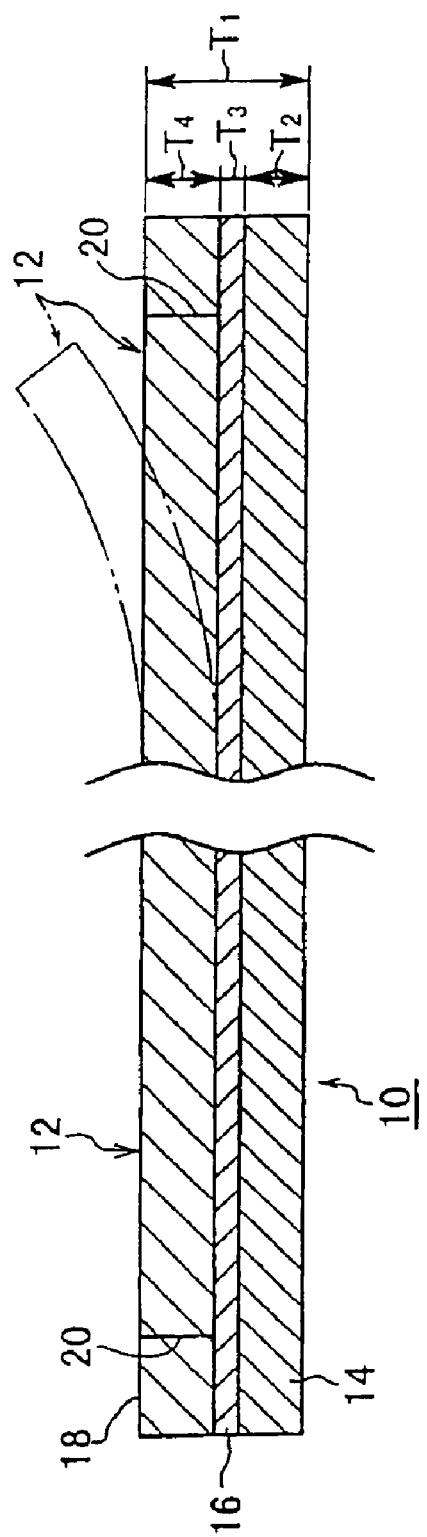
FIG. 2 is a cross-sectional view of the printing paper along line 2—2 in FIG. 1.

As shown in FIG. 2, the printing paper 10 is integrally formed in such a manner that a pressure sensitive adhesive layer 16 serving as an adhesive layer is provided on a base material 14, and the printing material 18 is superposed on the pressure sensitive adhesive layer 16. That is, the base material 14 and the printing material 18 have an even surface configuration. A pressure sensitive adhesive is uniformly applied over the whole surface of the base material 14, thereby forming the pressure sensitive adhesive layer 16 between the base material 14 and the printing material 18. Further, the cut line 20 provided so as to separate the sheet 12 runs from the top surface of the printing material 18 to the pressure sensitive adhesive layer 16. Therefore, the pressure sensitive adhesive layer 16 is exposed by separating the sheet 12.

Conventionally known pressure sensitive adhesives (adhesives which exhibit adhesive property only when a predetermined amount of pressure (high pressure) is applied thereto; for example, adhesives which leave no traces on the sheet 12 when the sheet 12 is peeled from the pressure sensitive adhesive layer 16) are used as the pressure sensitive adhesive layer 16. The printing material 18 is adhered to the base material 14 when pressure is applied to the pressure sensitive adhesive layer 16. For example, the pressure sensitive adhesive layer 16 is formed by the following processes. First, two parts by weight of styrene and 10 parts by weight of methyl methacrylate are subjected to graft copolymerization with respect to 10 parts by weight of natural rubber to obtain natural rubber latex. Then, five parts by weight of terpene resin tackifier is added to this natural rubber latex to obtain a base for the pressure sensitive adhesive. Sixty parts by weight of silica gel having an average particle size of 8 μm is added to 100 parts by weight of the base for the pressure sensitive adhesive to obtain a pressure sensitive adhesive composition, and this pressure sensitive adhesive composition is coated with a coating weight of 2 g/m². Further, once the printing material 18 is peeled from the base material 14, the pressure sensitive adhesive does not remain on the printing material 18. (Namely, the adhesive strength with respect to the printing material 18 is lost.) Therefore, the printing material 18 cannot be adhered to the base material 14 a second time. Furthermore, the thickness $T_1$ of the printing paper 10 is the sum of the thickness $T_2$ of the base material 14, the thickness $T_3$ of the pressure sensitive adhesive layer 16, and the thickness $T_4$ of the printing material 18.

Figure 3:
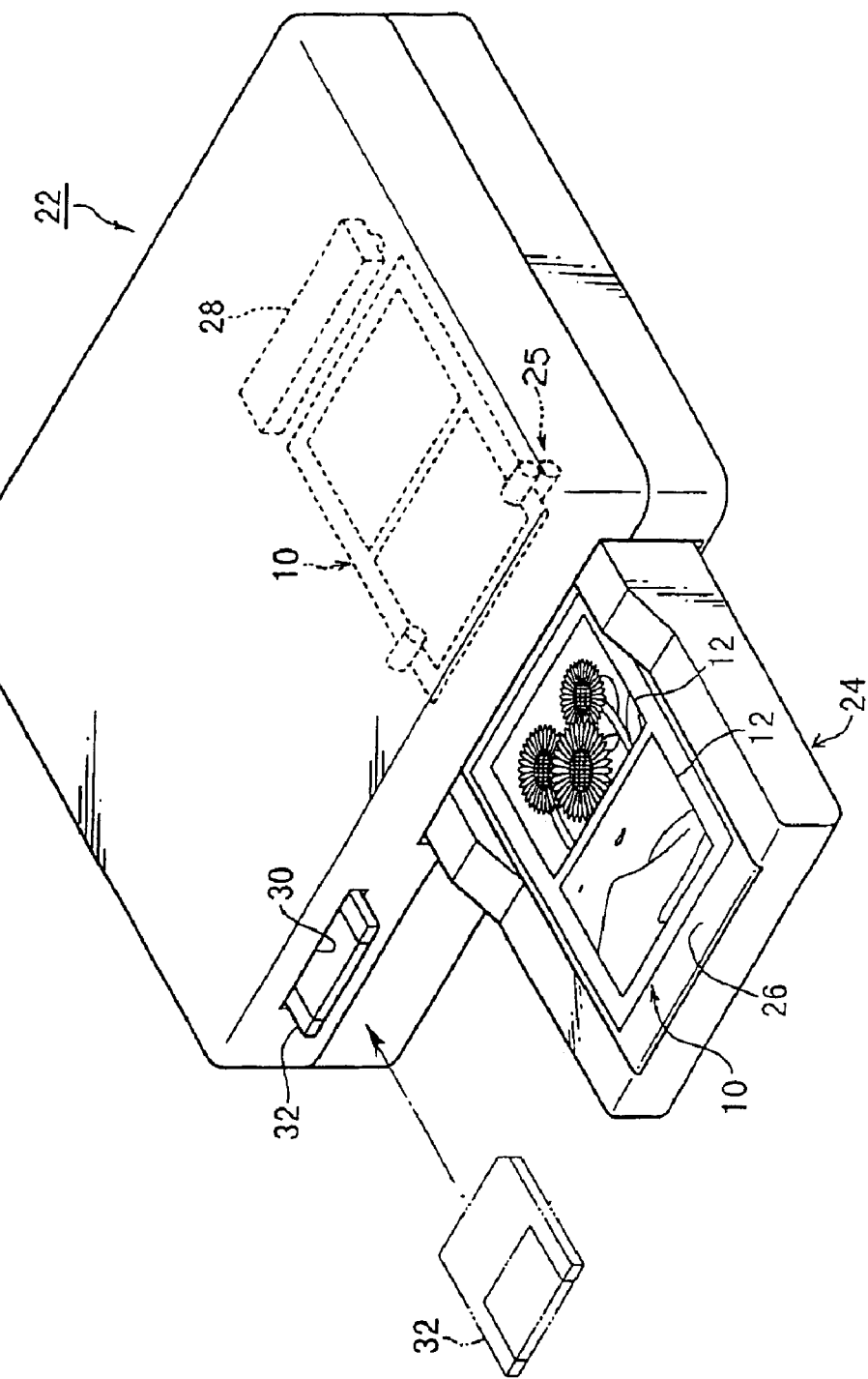
FIG. 3 is a perspective view which schematically shows the overall structure of a printer in which an image has been printed on the printing paper in FIG. 1.

As shown in FIG. 3, the printer 22 is a device for forming an image by thermally recording an image onto the printing paper 10 and fixing the recorded image by using light. An accommodating tray 24 for accommodating the printing paper 10 is disposed at the front of the printer 22. A support 26 for the printing paper 10 is formed on the upper surface of the accommodating tray 24.

Moreover, a conveying device 25 for conveying the printing paper 10 is disposed within the printer 22 at a position opposing the accommodating tray 24. The printing paper 10 is conveyed in such a manner that portions of the printing material 18 each corresponding to the margin portion width $L_4$ are nipped in the longitudinal direction. This conveying device 25 retracts the printing paper 10 from the accommodating tray 24 into the printer 22 and sends the printing paper 10 from the inside of the printer 22 onto the support 26.

Further, a thermal head 28 serving as a thermal recording means is provided within the printer 22, and an unillustrated light source is disposed at the upstream or downstream of the thermal head 28. This light source is used to fix respective color forming layers applied to the printing material 18.

A plurality of unillustrated operation keys are disposed on the top surface or the like of the printer 22. Further, an insertion slot 30 for inserting a recording medium 32 is formed at the front of the printer 22. Furthermore, an unillustrated connecting portion for connecting a camera, a computer, or the like (none of which are shown) is provided at the printer 22.

Next, operation of the present embodiment will be described. For example, when operation keys for printing are operated, based on the image data recorded on the recording medium 32 (including a camera or a computer), an image is printed onto the printing area 13 of the printing material 18 of the printing paper 10 which has been conveyed from the accommodating tray 24 by the conveying device 25. Namely, the thermal head 28 prints an image on the printing material 18 shown in FIG. 1 over the range of the printing area width $L_1$. The printing paper 10 with an image printed thereon is conveyed by the conveying device 25 so as to be discharged to the support 26, as shown in FIG. 3. The sheets 12 are separated from the printing material 18, and prints are thereby completed.

In the present embodiment, since the conveying device 25 conveys the printing paper 10 by nipping the positions of the printing paper 10 each corresponding to the margin portion width $L_4$, the printing paper 10 can be conveyed more reliably, and formation of defects on the image portion can be prevented. Further, in the present embodiment, the sheets 12 which have been separated from the printing material 18, i.e., the completed prints, do not have the margin portions of the prior art. Thus, as photographs, for example, the appearance of the sheets 12 is favorable.

In accordance with the present embodiment, after print processing is carried out on the printing area 13 of the printing material 18, a print having no margin portions is formed by detaching the sheet 12 from the printing material 18 along the cut line 20. Therefore, cutting position controlling mechanisms and paper cutting mechanisms as used in conventional printers are not necessary, and the structure of the printer 22 is made simple. Namely, in accordance with the present embodiment, since margins can be eliminated by using a simple structure, particularly photographic printers and the like are made compact and inexpensive.

In accordance with the present embodiment, the adhesive layer is formed of the pressure sensitive adhesive. Therefore, even if the sheet 12 is peeled off the base material 14 during printing or conveying of the sheet 12, the sheet 12 does not adhere to the thermal head 28 or the like.

Figure 4:
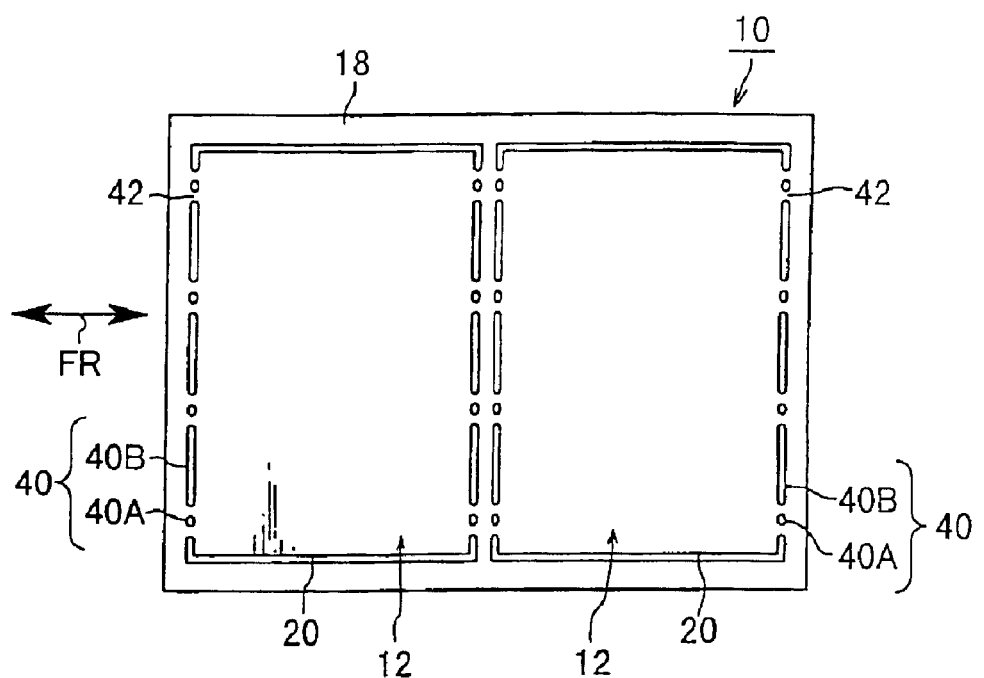
FIG. 4 is a plan view showing a modification of cut lines in FIG. 1.

As shown in FIG. 4, the cut line 20 shown in FIG. 1 may be formed in such a way that the transverse direction edge portions of each sheet 12 are formed by arranging, in an alternate manner, cut portions 40 and separating portions 42 separating the cut portions 40. Namely, the transverse direction end portions of each sheet 12 may be formed by so-called alternate long and short dash lines. Each cut portion 40 includes a dot 40A and a line 40B extending in the longitudinal direction of the sheet 12. The dots 40A and the lines 40B are alternately formed along the transverse direction edge portions of the sheet 12.

As shown in FIG. 4, the cut portions 40 and the separating portions 42 are alternately arranged in a direction orthogonal to the conveying direction of the printing paper 10 (i.e., in the direction of arrow FR in FIG. 4). Namely, the cut portions 40 and the separating portions 42 are alternately arranged in the same direction as the longitudinal direction of the sheet 12. As a result, the sheet 12 is not easily detached from the printing material 18 during printing.

Although shown as a thick line in FIG. 4, the cut line 20 is formed as a thin line, in the same way as in FIG. 1. Further, the shape of the cut line 20 is not limited to that shown in FIG. 4. For example, the cut line 20 may be formed as a broken line, a line with a long dash alternating with two short dashes, or the like, by changing the shapes and the order of the cut portions 40 and the separating portions 42. Furthermore, the cut line 20 formed by the cut portions 40 and the separating portions 42 may be provided at a portion along the conveying direction of the printing paper 10.

Figure 5:
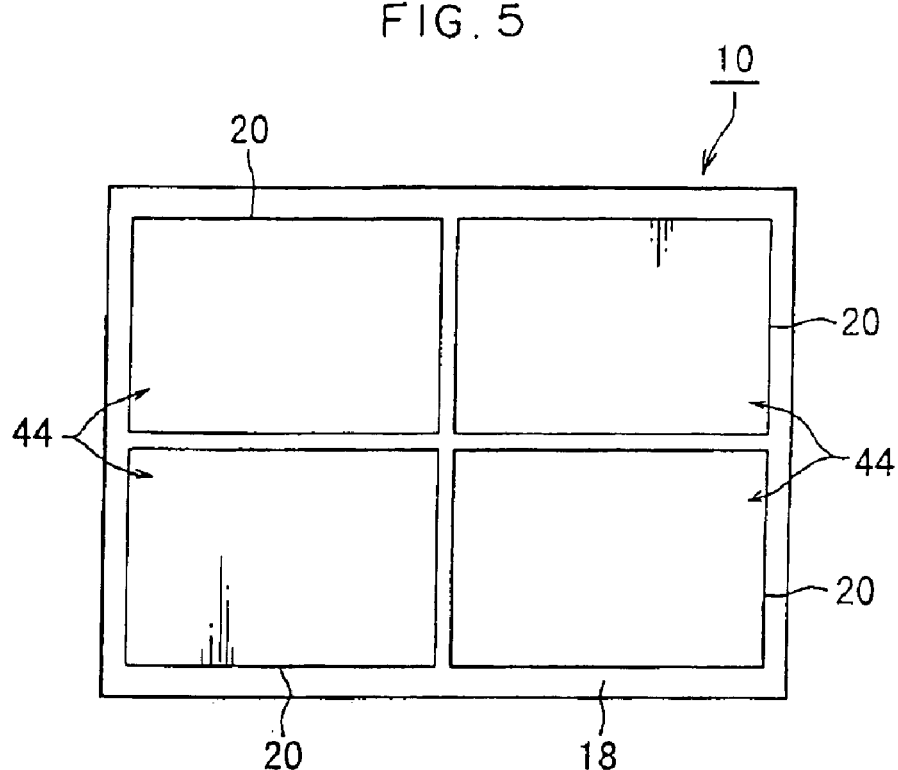
FIG. 5 is a plan view showing a modification of the number of sheets in FIG. 1.
Figure 6:
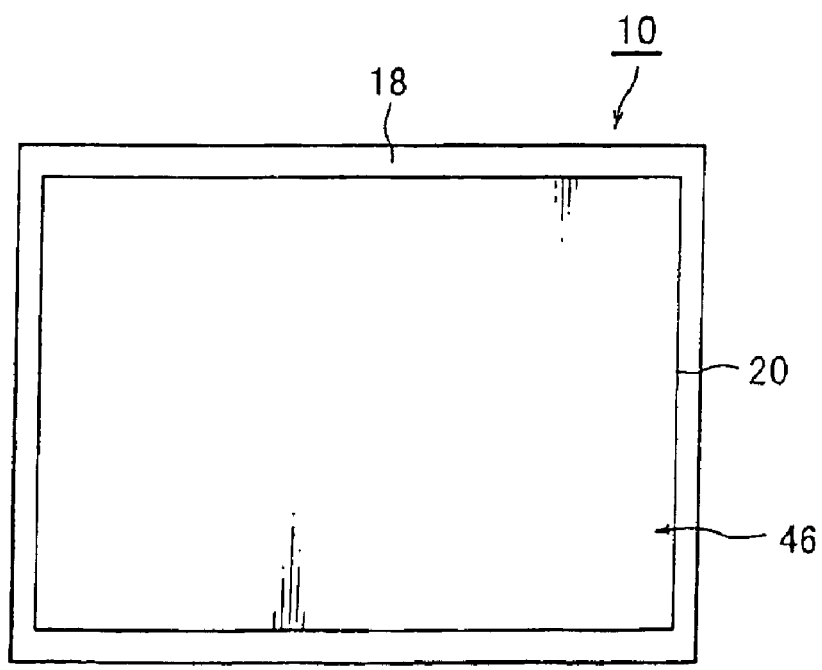
FIG. 6 is a plan view showing a modification of the number of the sheets in FIG. 1.

Although two sheets 12 are formed on the printing material 18 in the above-described embodiment, the number of the sheets is not limited to two in the present invention. For example, as shown in FIG. 5, the printing material 18 may be divided into four so as to form four sheets 44. Alternatively, as shown in FIG. 6, one sheet 46 which is slightly smaller than the printing material 18 may be formed. In other words, the number of sheets provided on the printing material 18 can be optionally changed in the present invention.

Moreover, although the adhesive layer is formed of the pressure sensitive adhesive in the above-described embodiment, adhesive strength of the adhesive layer may be changed in accordance with the type of the printing material 18 and the type of the base material 14.

Figure 7:
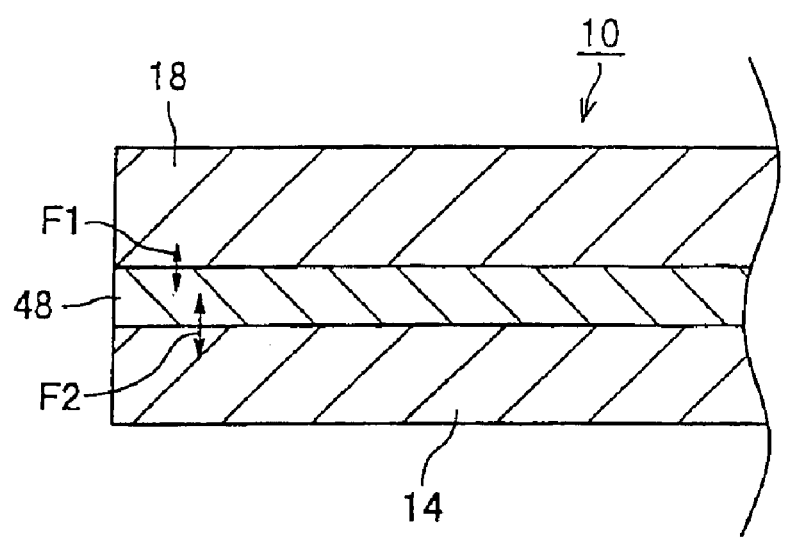
FIG. 7 is a cross-sectional view showing a modification of adhesive strength in FIG. 2.

The adhesive 48 in the present embodiment is an adhesive which is conventionally used, such as an adhesive disclosed in JP-A No. 7-214948. Further, the printing material 18 can be coating paper, and the base material 14 can be paper, for example. As shown in FIG. 7, the adhesive strength F1 of the adhesive 48 with respect to the printing material 18 is set so as to be smaller than the adhesive strength F2 of the adhesive 48 with respect to the base material 14.

Accordingly, in the present embodiment, since the adhesive strength F1 of the adhesive 48 with respect to the printing material 18 is weak, once the printing material 18 is peeled off the base material 14, the adhesive 48 does not remain on the printing material 18, and the printing material 18 does not adhere to the base material 14 a second time, as in the case in which the pressure sensitive adhesive is used as the adhesive layer.

Figure 8:
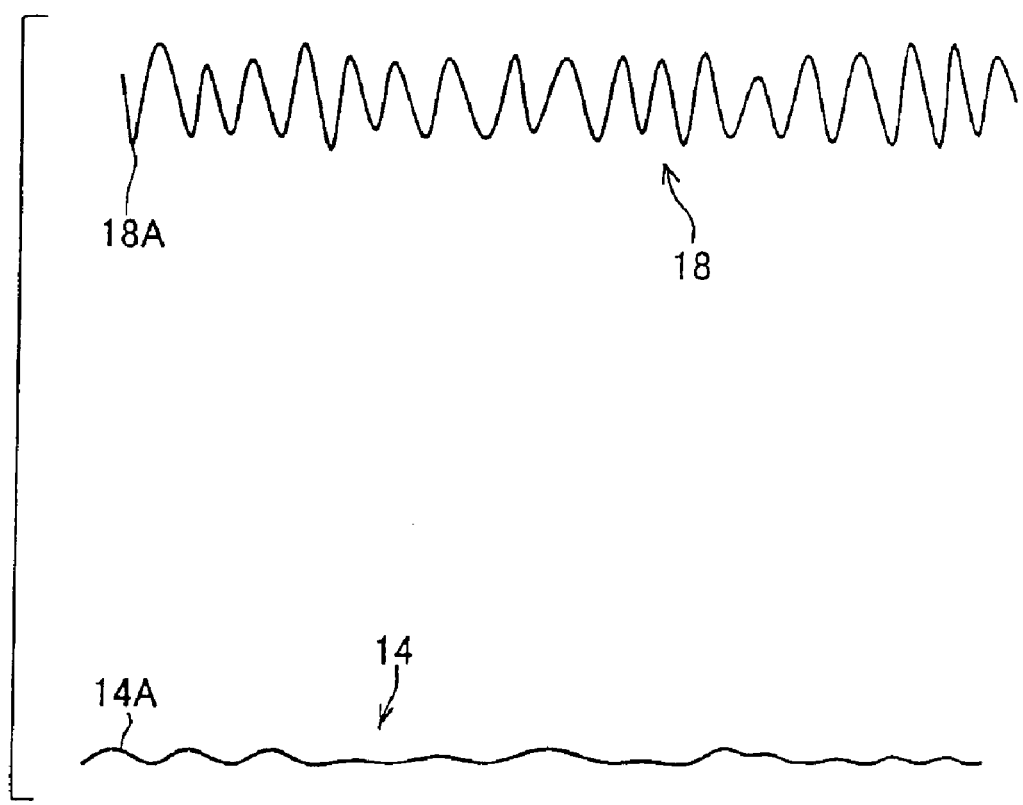
FIG. 8 is a cross-sectional view showing a modification of adhesive strength in FIG. 2.

Moreover, the adhesive strength of the adhesive layer can be changed by respectively carrying out surface treatment of the adhesion surfaces of the printing material 18 and the base material 14. For example, as shown in FIG. 8, surface roughness of an adhesion surface 18A of the printing material 18 may be increased so as to decrease the contact area with respect to an adhesion surface 14A of the base material 14. The operation and effect similar to those of FIG. 7 are achieved in this case as well. In the present invention, the adhesive strength of the adhesive layer may also be changed by coating the adhesion surfaces of the printing material 18 and the base material 14 with resin or the like.

Further, in the present invention, the thickness of the sheet 12, i.e., the thickness of the printing material 18 can be optionally changed. In this case, as shown in FIG. 9, the thickness $T_1$ of the printing paper 10 is set to be the same as that of the printing paper 10 shown in FIG. 2. By setting the thickness $T_1$ of the printing paper 10 so as to be uniform, when the printing paper 10 is conveyed by the conveying device 25, nipping pressure of the conveying device 25 with respect to the printing paper 10 is made uniform. As a result, the printing paper 10 is smoothly and reliably conveyed.

Namely, in accordance with the present embodiment, the conveying devices of the printer 22 can be set in accordance with only recording papers (printing papers 10) having the same thickness. Accordingly, a low-cost and highly reliable device (printer) can be provided.

In FIGS. 9A and 9B, the thickness $T_3$ of the pressure sensitive adhesive layer 16 is the same as that of the adhesive layer in FIG. 2. The thickness $T_1$ of the printing paper 10 is made uniform by changing the thickness of the base material 14 in accordance with changes in the thickness of the printing material 18.

FIG. 9A shows a case in which the thickness $T_5$ of the printing material 18, i.e., the sheet 12 is increased as compared with the thickness of the printing material 18 in FIG. 2. As the thickness of the sheet 12 is increased, the strength of the sheet 12 is increased, thereby preventing damage to the sheet 12.

On the other hand, FIG. 9B shows a case in which the thickness $T_6$ of the printing material 18, i.e., the sheet 12 is decreased as compared with the thickness of the printing material 18 in FIG. 2. As the thickness of the sheet 12 is decreased, when a plurality of sheets 12 are stored in a superposed manner, the plurality of sheets 12 do not become bulky. Therefore, carrying and storage of the sheets 12 are facilitated.

In the above-described embodiment, the printer 22 employs a sublimation type heat transfer system (thermal system). However, for example, printers employing heat transfer systems other than the sublimation type systems, printers employing ink jet systems, printers employing electrophotographic systems, or the like can be used as the printer according to the present invention.

As described above, in accordance with the present invention, printing processing is carried out on a printing portion of a printing material, and subsequently, the printing portion is detached from the printing material such that a print having no margins is formed. Therefore, cutting position controlling mechanisms and paper cutting mechanisms such as those used in conventional printers are no longer necessary, and thus the structure of the printer is simplified. Namely, in accordance with the present invention, since margins can be eliminated by using a simple structure, photographic printers and the like in particular can be made compact.

What is claimed is:

1. A method for printing an image on a printing paper by a printer, comprising the steps of:

accommodating a printing paper in an accommodating portion;

conveying the printing paper from said accommodating portion to a recording device by a conveying device by nipping margins of the printing paper;

printing an image on the printing paper by the recording device;

conveying the printing paper from the recording device to a discharging portion by the conveying device by nipping margins of the printing paper; and discharging the printing paper with the image printed thereon to the discharging portion, wherein the printing paper includes at least one printing portion and the margins, and a print is formed by detaching the at least one printing portion from the printing paper after the printing paper with the image printed thereon is discharged to the discharging portion; and wherein the step of conveying the printing paper from the accommodating portion to the recording device is performed by nipping the printing paper at substantially spaced apart locations so as to avoid nipping the at least one printing portion of the printing paper; and wherein the printing paper that is conveyed comprises at least one intermittent cut line in which a plurality of cut portions and a plurality of separating portions separating the plurality of cut portions are alternatively formed, the at least one intermittent cut line is formed along only one direction of the printing paper that is orthogonal to a conveying direction of the printing paper within the recording device, and a continuous cut line extending in a longitudinal direction of the printing paper and orthogonal to the at least one intermittent cut line, and the at least one printing portion is detached from said printing paper along the at least one intermittent cut line and the continuous cut line.

2. A method according to claim 1, wherein, by setting a predetermined value for the sum of a thickness of a printing material, a thickness of a base material, and a thickness of an adhesive layer, a predetermined value is set for the nipping pressure at which the margins are nipped by the conveying device.

3. A method according to claim 1, wherein the recording device is set to print an image on the at least one printing portion of the printing paper, and the margins allow for errors generated when the recording device prints an image on the printing paper.

4. A method according to claim 1, wherein the margins are provided along a direction in which the conveying device conveys the printing paper.

5. The method according to claim 1, wherein the step of conveying the printing paper from the recording device to the discharging portion is performed by nipping the printing paper at substantially spaced apart locations so as to avoid nipping the image receiving portion of the printing paper.

6. The method according to claim 1, wherein the steps of conveying the printing paper from said accommodating portion to the recording device and from the recording device to the discharging portion are performed by nipping the printing paper only in the margins so as to avoid nipping the image receiving portion of the printing paper.

7. The method according to claim 1, wherein the printing paper that is conveyed comprises:

a printing material having a printing portion;

a base material for supporting the printing material; and an adhesive layer that removably adheres the printing material to the base material, the adhesive layer having substantially no adhesive strength remaining on the printing portion after the printing portion is detached from the printing material;

wherein the printing portion is detached from the printing material so as to form a finished print;

wherein the at least one printing portion is defined by the at least one intermittent cut line in which the plurality of cut portions and the plurality of separating portions separating the plurality of cut portions are alternately formed; and wherein the at least one intermittent cut line extends substantially along an entire side of the printing portion;

wherein the printing portion is further defined by the continuous cut line penetrating the printing material and extending in a longitudinal direction of the printing paper, orthogonal to the at least one intermittent cut line, and substantially along another entire side of the printing portion;

wherein the continuous cut line and the at least one cut line do not cut through the base material, and the at least one printing portion is detached from the printing material along the at least one intermittent cut line and the continuous cut line; and wherein the printing paper is an individual sheet configured to be fed in a printer, the printer being for print media that are individually fed in the printer.

8. The method according to claim 1, wherein the printing paper is a first printing paper, and the method further comprises the steps of:

accommodating a second printing paper in the accommodating portion;

conveying the second printing paper from the accommodating portion to the recording device by the conveying device by nipping margins of the second printing paper;

printing a second image on the second printing paper by the recording device;

conveying the second printing paper from the recording device to the discharging portion by the conveying device by nipping margins of the second printing paper; and discharging the second printing paper with the second image printed thereon to the discharging portion, wherein the second printing paper includes at least one printing portion and respective margins, and a second print is formed by detaching the at least one printing portion from the second printing paper after the second printing paper with the second image printed thereon is discharged to the discharging portion; and wherein the step of conveying the second printing paper from the accommodating portion to the recording device is performed by nipping the second printing paper at substantially spaced apart locations so as to avoid nipping the at least one printing portion of the second printing paper.

9. The method according to claim 8, wherein the first printing paper comprises a first base material layer, a first adhesive layer, and a first printing material layer;

the second printing paper comprises a second base material layer, a second adhesive layer, and a second printing material layer; and wherein the overall thickness of the first printing paper is substantially equal to that of the second printing paper, with at least two layers of the first printing paper each having a substantially different thickness than the corresponding layers of the second printing paper.

10. The method according to claim 1, wherein the recording device prints an image on the at least one printing portion of the printing paper, such that the printed image traverses at least one of the intermittent cut line and the continuous cut line.

11. The method according to claim 1, wherein the printed image is a photograph.

12. The method according to claim 1, wherein the printing paper is configured for use with a sublimation type heat transfer system recording device.

* * * * *